US005416307A

United States Patent [19]

Danek et al.

[11] Patent Number: 5,416,307

[45] Date of Patent: May 16, 1995

[54] CURRENCY PAPER VERIFICATION AND DENOMINATION DEVICE

[76] Inventors: Robert Danek, 30 S. Stonybrook Dr., Marlborough, Conn. 06447; Richard Menelly, 87 Bezden Rd., Burlington, Conn. 06013

[21] Appl. No.: 115,775

[22] Filed: Sep. 3, 1993

[51] Int. Cl.[6] .................... G06K 7/08

[52] U.S. Cl. .................... 235/449; 235/375; 235/454

[58] Field of Search .................... 235/375, 449, 469, 462, 235/454

[56] References Cited

U.S. PATENT DOCUMENTS

| | | | |
|---|---|---|---|
| 3,544,771 | 12/1970 | O'Meara | 235/469 |
| 3,980,990 | 9/1976 | Berube . | |
| 4,524,276 | 6/1985 | Ohtombe . | |
| 4,652,015 | 3/1987 | Crane . | |
| 4,761,205 | 8/1988 | Crane . | |
| 4,814,589 | 3/1989 | Storch | 235/462 |
| 4,980,569 | 12/1990 | Crane et al. . | |
| 5,023,434 | 6/1991 | Lanfer | 235/469 |
| 5,151,607 | 9/1992 | Crane et al. . | |
| 5,210,398 | 5/1993 | Metlisky . | |

*Primary Examiner*—Harold Pitts

[57] ABSTRACT

A linear array of photo-emitters and photodetectors is positioned on one side of currency paper subjected to verification for authenticity under transmitted and reflected light. The focus of the photo emitters is adjusted for the top surface, center and bottom surface of the currency paper. A logic circuit-determines the presence or absence of the security feature and correspondingly provides visual or audible indication thereof. A memory device contains stored information identifying currency denomination and a comparison is made at the time of verification to also determine the denomination of the proffered currency. The photo emitters, photo-detectors and related circuitry are arranged within an enclosure that is located next to a currency-receiving device such as a cash register. Visual or audible indicators are mounted on the device for immediate indication of the currency verification to the cashier along with the currency denomination. The arrangement of the photo emitters and photo-detectors transverse to the major length of the currency paper detects the security feature while confirming that the security feature is within the currency paper and not on either surface.

11 Claims, 4 Drawing Sheets

CURRENCY PAPER VERIFICATION AND DENOMINATION DEVICE

BACKGROUND OF THE INVENTION

The use of a metallized plastic strip embedded within currency paper as a security thread for counterfeit deterrence is described within U.S. Pat. Nos. 4,652,015 and 4,761,205. The security thread is virtually undetected under reflected light and legible under transmitted light to verify its presence.

In commercial situations where verification of currency bills is required, the receiver of the currency bill must subject the currency to a relatively intense light source to read the security thread under transmitted light. With large queues of customers at a bank or supermarket, as well as in places of low level illumination such as bars and restaurants it is difficult to visually inspect the corresponding large number of currency bills. It would be advantageous therefore to have some means of automatically determining the presence of the requisite security thread and confirming authenticity to the teller or cashier. U.S. Pat. No. 3,980,990 entitled "Ferromagnetic Currency Validator" describes a magnetic detection circuit which first submits a proffered currency paper to a magnetic source to magnetize the ferromagnetic ink used with the signature on the portrait surface of the bill. U.S. Pat. No. 4,524,276 entitled "Apparatus for Detecting a Security Thread Embedded in a Paper-Like Material" describes an infrared radiation source and two infrared radiation detectors used to determine whether or not a security thread is embedded in the paper-like material and also to determine what the detected security material is made of.

Countries outside of the United States that employ plastic or metal security threads embedded in their paper currency, require that the presence of such security threads be ascertained under transmitted light such as described in the aforementioned U.S. Pat. No. 4,524,276. In accordance with the United States requirement that the currency security thread be detected under transmitted light and not seen under reflected light, both reflective and transmissive determinations are made for complete verification of the currency.

U.S. Pat. No. 4,980,569 describes a security paper verification device wherein optical means are arranged on opposing surfaces of the currency to determine the absence of any device on the surface of the currency paper while detecting the presence of the device within the currency. This is to prevent attaching counterfeit security threads to the outside surface of the currency paper to replicate genuine currency.

U.S. Pat. No. 5,151,607 entitled "Currency Verification Device" describes the combination of optical means with inductive or capacitive sensors for verifying the presence of the security thread in currency paper.

U.S. patent application Ser. No. 814,824 filed Dec. 31, 1991 entitled "Security Paper Verification Device" describes optical, magnetic and capacitive sensors used in combination to determine currency authenticity. The dark inks and dyes used in printing U.S. federal reserve notes could provide difficult indication of a metallized security thread when such optical sensors are used, per se.

U.S. patent application Ser. No. 871,196 filed Apr. 20, 1992 entitled "Security Paper Verification Device" describes an optical array arranged on both sides of a currency-receiving slot to determine whether the requisite security thread is present within the paper or on either surface. The device includes a microprocessor for calibration of the optical arrays. It would be economically advantageous and mechanically convenient to arrange optical sensing means on a single side of the preferred currency for verification and denomination.

Accordingly, one purpose of the invention is to describe inexpensive circuits and devices for single-sided currency verification and denomination.

SUMMARY OF THE INVENTION

Currency verification is made by means of photoemitters or lasers arranged on one side of paper currency to excite corresponding photo-detectors arranged on the same side thereof to verify the presence of the embedded security thread in combination with a logic circuit. The "signature" of currency paper having a security thread along with the currency denomination is positionally determined transverse to the major length of the currency paper to establish denomination relative to the dark inks and dyes used in printing the currency paper and is stored within a processor circuit. Currency verification and denomination is realized when the photo-detectors reproduce the signature in accordance with the associated logic and processor circuits. Indication of PASS or FAILURE is provided by means of red and green LED's and the currency denomination value is entered within the cash receiver.

DESCRIPTION OF THE PREFERRED EMBODIMENT

Figure 1:
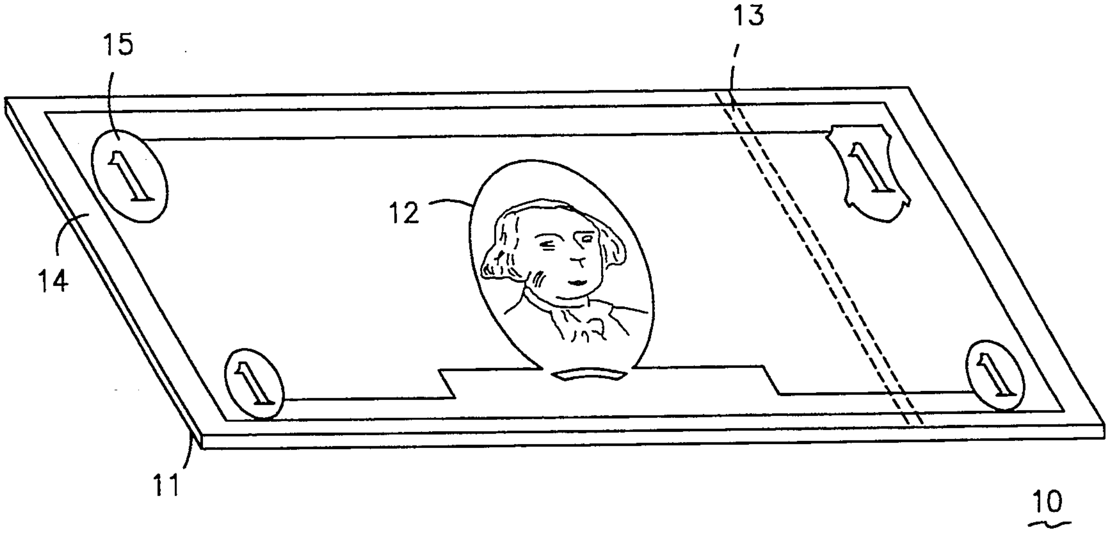
FIG. 1 is a top perspective view of a U.S. currency bill employing a selectively metallized security thread.

FIG. 1 depicts one type of United States currency 10 consisting of a paper bill 11 having the portrait 12 of a United States president or the like and including a security thread 13 embedded therein. The bill is selectively color-printed to enhance the various features printed on both sides of the bill except for a border 14 and currency denomination indicia 15 which retain the basically "white" color of the currency paper prior to printing. It is noted that the security thread extends transversely across the linear extent of the bill from the top to the bottom thereof. The security thread is introduced within the paper in the manner described within the aforementioned U.S. Pat. Nos. 4,652,015 and 4,761,205. The security thread is of the type consisting of a selectively metallized plastic film that is virtually invisible in reflected light and readily apparent under transmitted light. In order to verify the authenticity of such currency, a two-fold test must be performed, whereby the security thread must not be detected upon reflected light and, on the other hand, must be detected under transmitted light.

The verification and denomination arrangement of the invention can be used with a cash receiver such as described in U.S. Pat. No. 4,980,659 to provide electromagnetic as well as electromechanical interlock so that the cash receiver drawer would not open in the event that counterfeit currency is detected within the verification device.

To provide single-sided verification, three optical hand scanners 17, 18, 19, are arranged within the verification device 16 located above the top outer surface 20 of the currency 10. The scanners are of the type that contain both the light source as well as the receiver such as a type GS-800 scanner supplied by Mustek Co. A plurality of U.S. currency denominations is scanned by the first scanner 17 to develop signatures indicative of the currency denomination using image processing and correlation algorithms. A file corresponding to the signatures is stored in look-up table format within the associated circuitry. Other signatures could also be generated for banknotes, travelers' checks and the like. A second algorithm is used to read the test file generated by the test image and to correlate the test image array with the reference array and identify which of the reference arrays matches the test array for denomination indication. A compensation algorithm provides filtering to discount data bits which may not correspond exactly to the stored data to compensate for fading effects as well as slight printing offsets. The same currency denominations are scanned by the second scanner 18 to provide a file corresponding to the security threads for each of the denominations since each security thread spells the denomination and accordingly presents a different reflective pattern to the scanner. The first scanner is arranged with a focal length d1 to focus on the top outer surface 20 and is compared with first stored data to determine the denomination of the currency as described earlier and to insure that a counterfeit security thread is not attached to the top outer surface. The second scanner 18 is arranged with a focal length d2 to scan the center 21 between the outer surface 20 and the bottom inner surface 22 to detect the presence of a valid security thread 13. The second scanner compares the pattern on the center with second stored data to determine whether the security thread is present. The third scanner 19 is arranged with a focal length d3 to scan the bottom inner surface 22 to compare the pattern on the bottom inner surface to insure that a counterfeit security thread is not attached to the bottom outer surface 23. A simplified arrangement can be used in place of the three scanners 17–19 by replacing the standard focus scanner with a multi-focus scanner such as described within U.S. Pat. No. 5,210,398 whereby a single scanner can scan both the outer surface and the center simultaneously. A first pattern is developed corresponding to the images generated on the surface for each currency denomination and a second pattern is developed for the security threads in the center corresponding to the denominations. The information is stored and a comparison is made to determine authenticity by using a single scanner and accompanying circuitry as described below. Alternatively, a first pattern could be generated on the top surface of a currency not containing a security thread and a second pattern is generated on the top surface of a currency containing a genuine thread. The first pattern is stored and is then subtracted from the second to reveal indication of the presence of the thread within genuine currency.

Figure 2:
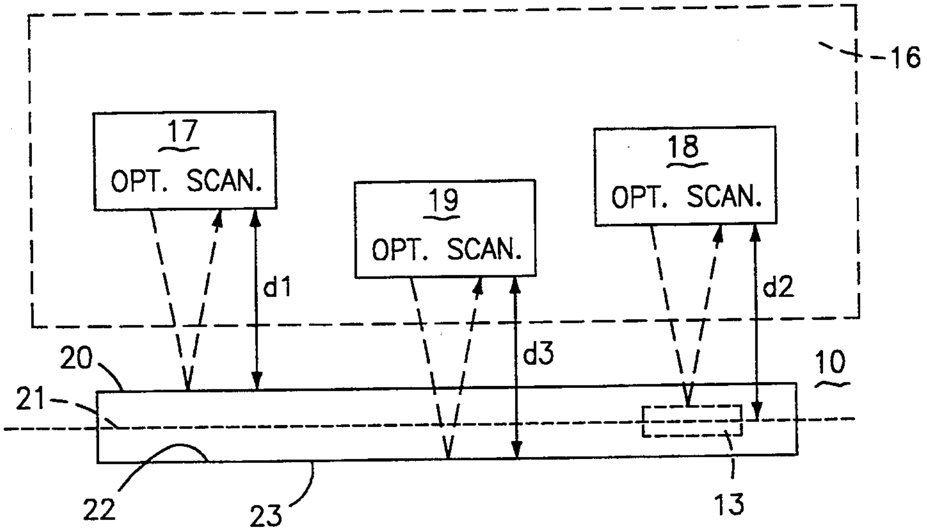
FIG. 2 is an enlarged side view of the optical arrangement in accordance with the invention.
Figure 3:
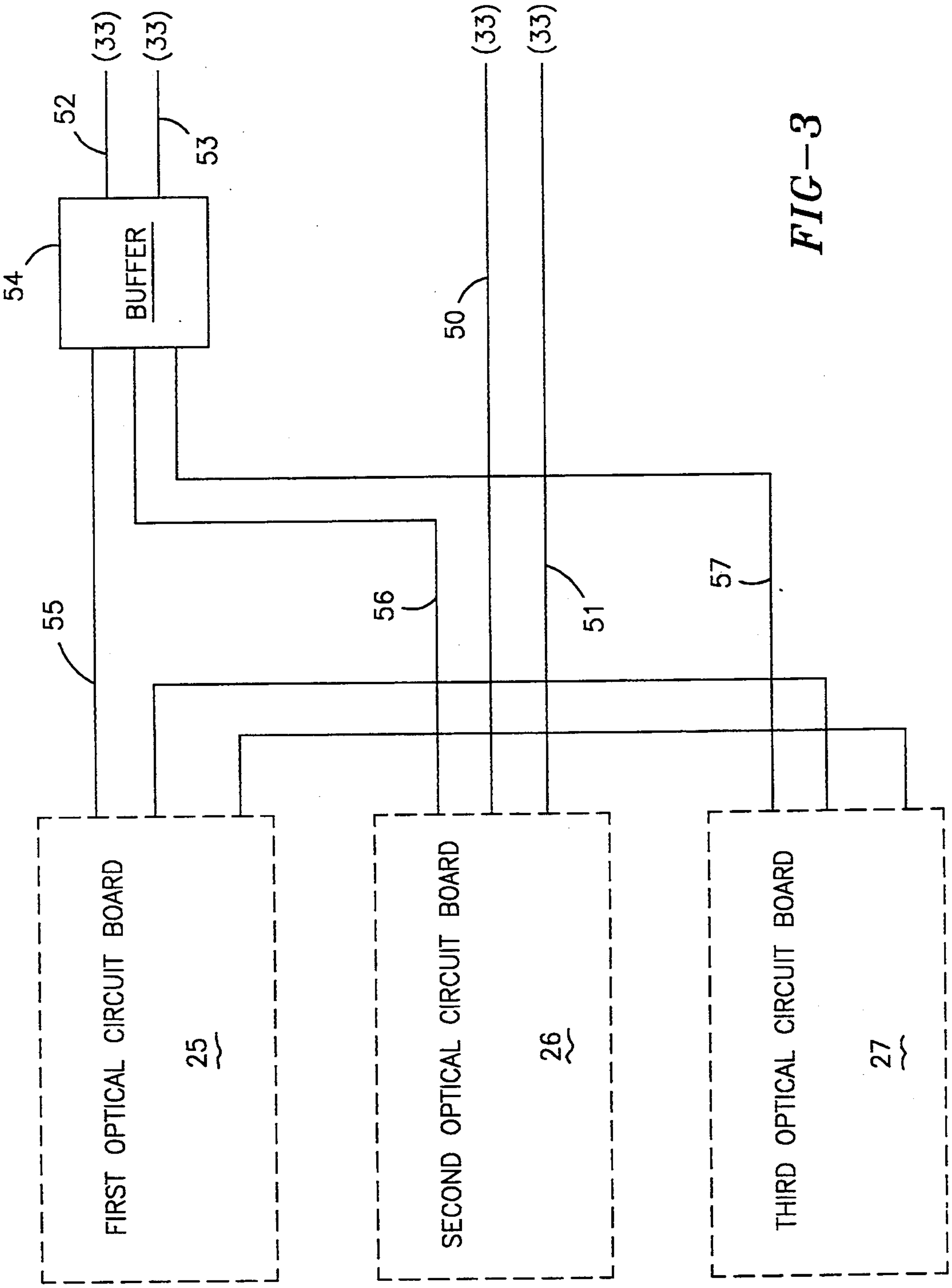
FIG. 3 is a schematic representation of the circuits within the optical arrangement of FIG. 2.

The first, second and third optical circuit boards 25–27 used within the optical scanners of FIG. 2 are depicted in FIG. 3 and are interconnected together and with a microprocessor 33 (FIG. 5) by means of a data bus 50. The optical circuit select commands are supplied to the optical circuit boards over conductors 55–57 which connect with a buffer 54. The buffer connects with the microprocessor output ports over conductors 52, 53. The control commands are supplied from the microprocessor to the optical circuit boards over conductor 51.

Figure 4:
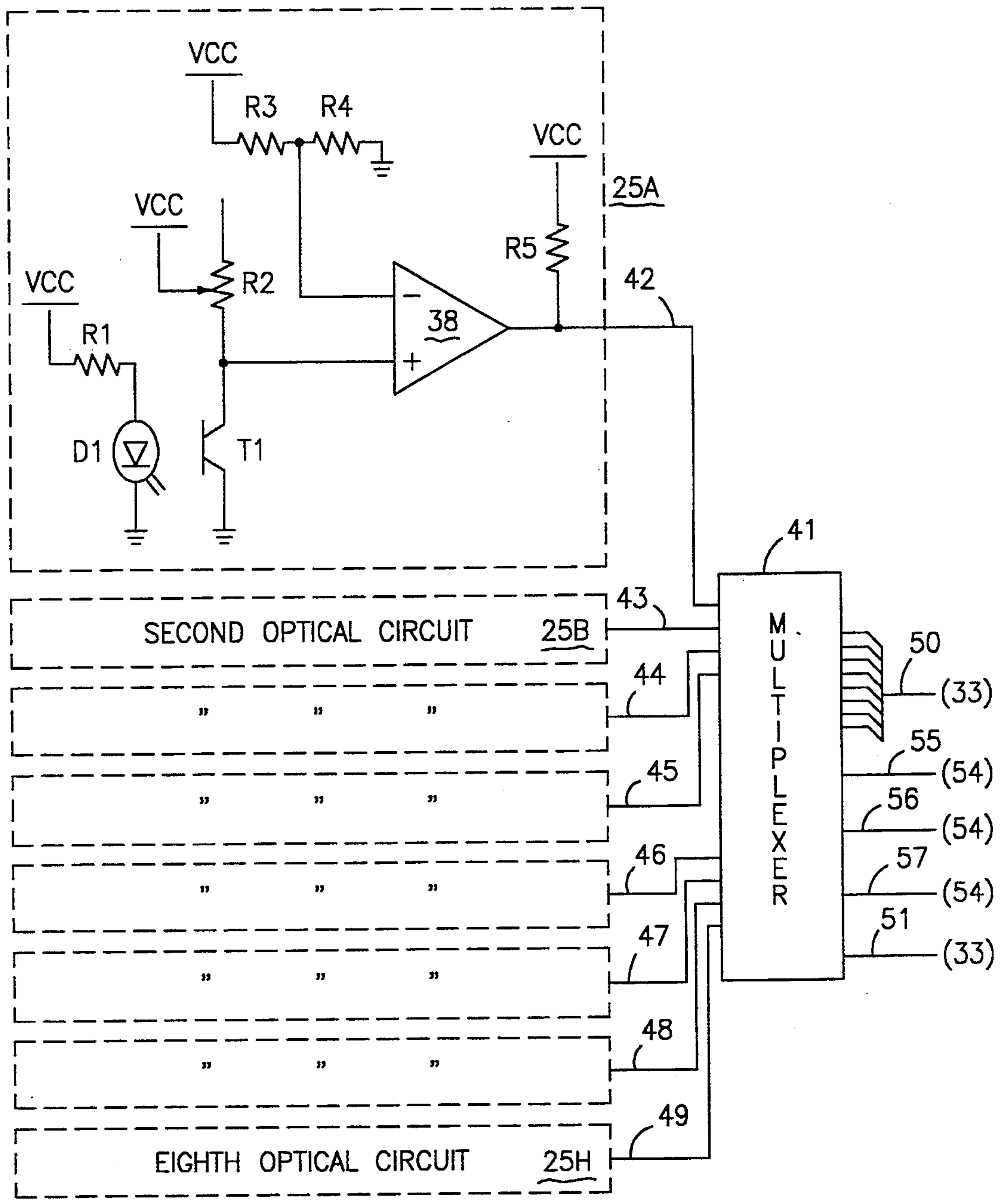
FIG. 4 is a schematic representation of the optical circuits used with the optical arrangement of FIG. 2.

The optical circuit 25A within the first optical circuit board 25 is shown in FIG. 4 and consists of a semiconductor laser or light emitting diode D1 which is biased through a first resistor R1 and a phototransistor T1 which receives reflected light from the top surface of the currency and provides a signal to the first input to a comparator 38 which is biased by means of a second resistor R2. The signal is compared to a preset value on the second input to the comparator which is supplied by a voltage divider consisting of the resistors R3, R4. Bias to the comparator is provided through the resistor R5, as indicated. The output of the comparator is in the form of a digital 1 or 0 depending upon the reflective pattern generated by reflection. One such LED and phototransistor pair is a type MLED71 and MRD711 supplied by Motorola Co. The real time output of the comparator is provided over conductor 42 to the multiplexer 41. The real time outputs from the second through eighth optical circuits 25B–25H are provided over corresponding conductors 43–49, as indicated. The number of optical circuits can be increased to provide as much detail as required to produce the original pattern that is stored in memory. The collective data is inputted to the microprocessor 33 (FIG. 5) over the data bus 50. The optical circuit selection signals are received from the buffer 54 within the circuit of FIG. 3 over conductors 55–57. The latch command signals to the multiplexer are received from the microprocessor over conductor 51.

Figure 5:
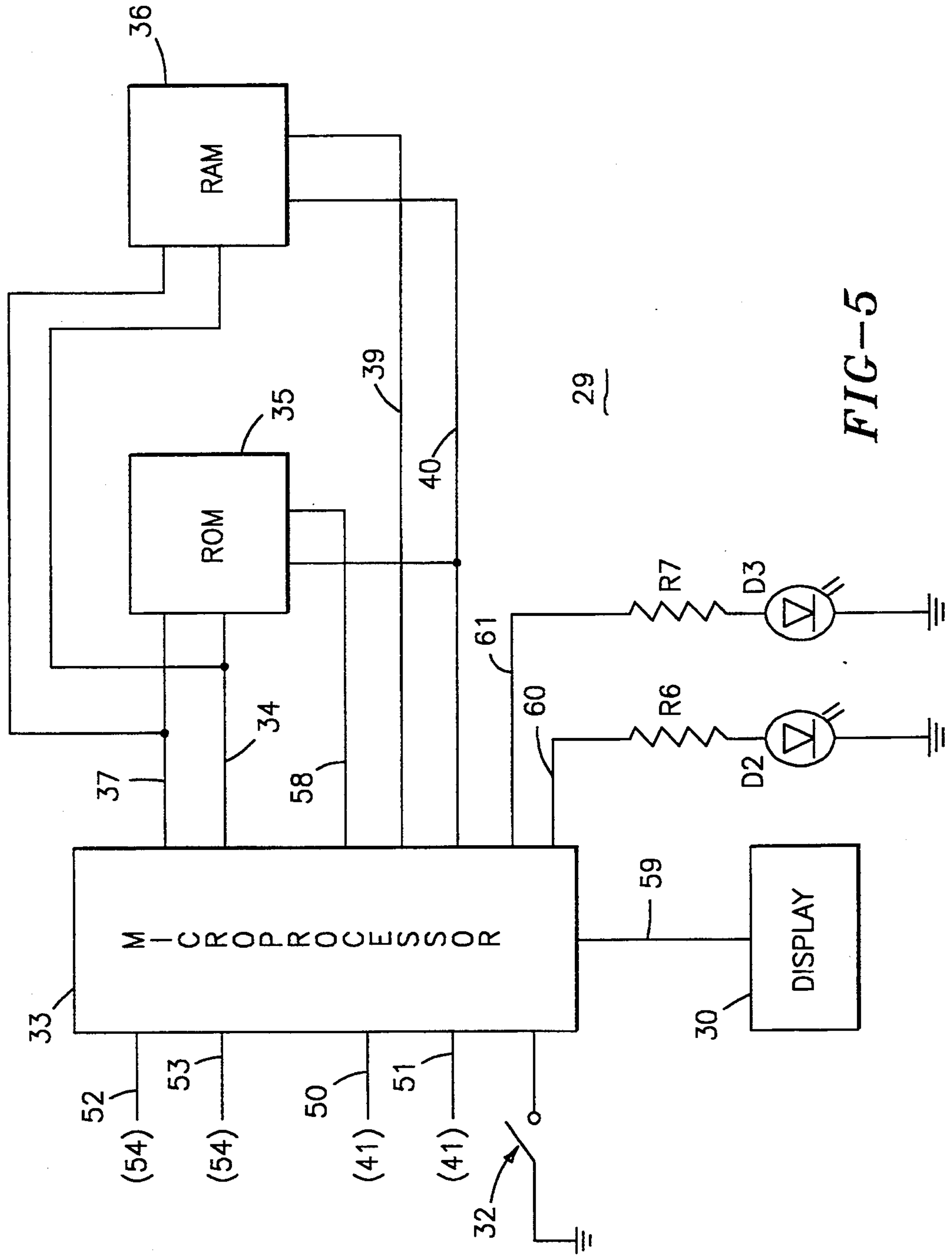
FIG. 5 is a schematic representation of the logic circuits used with the optical arrangement of FIG. 2.

The logic circuit 29 containing the microprocessor 33 is shown in FIG. 5. One output port connects with the multiplexer 41 of FIG. 4 over conductor 51 while two output ports connect with the buffer 54 of FIG. 3 over conductors 52, 53. The real time data from the multiplexer is inputted to the microprocessor over the data bus 50 and is entered into the RAM 36 and ROM 35 by means of the data bus 37. The address bus 34 addresses the ROM and RAM to make the comparisons with the stored data. The select conductor 40 interconnects the microprocessor with the ROM and the RAM. The enable conductors for the ROM and RAM are designated at 58 and 39. Alphanumeric indication of the currency denomination is provided to the display 30 by means of the conductor 59. A green LED D2 connects with the microprocessor through conductor 60 and resistor R6 and provides indication as to the presence of the security thread and the red LED D3 connects with the microprocessor through conductor 61 and resistor R7 and provides indication of its absence. The clear switch 32 clears the status indicating LEDs before and after each reading by the microprocessor.

A simplified arrangement has herein been described for single-sided optical verification of security papers of the type containing security threads as well as watermarks which are not readily visible on the outer surface of the paper. Genuine currency is scanned to produce a signature which is stored in memory. Subsequent scans are compared to the stored signature to determine verification as well as denomination.

We claim:

1. Apparatus for verifying and denominating currency comprising:

a currency having indicia of predetermined value and an embedded security thread, said currency defining a rectangle having a defined length and a defined width;

a plurality of first light emitters in a first array on one side of said currency along said width;

a corresponding plurality of first light detectors on said one side in optical communication with said first light emitters;

said first light detectors being connected with a logic circuit containing first stored data indicative of a plurality of values;

comparator means comparing first output received from said first light detectors with said first stored data for determining said predetermined value a plurality of second light detectors on said one side in optical communication with a second plurality of light emitters on said one side said second light detectors being connectors with a logic circuit containing second stored data indicative of said security thread; and comparator means comparing second output received from said second light detectors with said second stored data for determining said security thread.

2. The apparatus of claim 1 wherein said first light emitters and light detectors comprise a first optical scanner.

3. The apparatus of claim 2 wherein said first optical scanner is arranged for focusing on said top part.

4. The apparatus of claim 1 wherein said second plurality of light emitters and light detectors comprises a second optical scanner.

5. The apparatus of claim 1 including a third plurality of light emitters and light detectors providing a third optical pattern corresponding to indicia determined along a bottom surface of a proffered paper.

6. The apparatus of claim 5 wherein said third plurality of light emitters and light detectors comprises a third optical scanner.

7. The apparatus of claim 1 including a first plurality of comparators connecting with said first plurality of light detectors proving a first logic input to said logic circuit.

8. The apparatus of claim 1 including a second plurality of second comparators connecting with said second plurality of light detectors proving a second logic input to said logic circuit.

9. The apparatus of claim 8 wherein said stored values further include identification of said security fiber.

10. The apparatus of claim 9 wherein location of said security fiber provides indication of currency denomination.

11. A method of verifying and denominating currency comprising steps of:

providing a currency having indicia of predetermined value and an embedded security thread, said currency defining a rectangle having a defined length and a defined width;

arranging a plurality of first light emitters in a first array on one side of said currency along said width;

arranging a corresponding plurality of first light detectors on said one side in optical communication with said first light emitters;

connecting said first light detectors with a logic circuit containing first stored data indicative of a plurality of values;

comparing first output received from said first light detectors with said first stored data for determining said predetermined value arranging a plurality of second light detectors on said one side in optical communication with a second plurality of light emitters on said one side connecting said second light detectors with a logic circuit containing second stored data indicative of said security thread; and comparing second output received from said Second light detectors with said second stored data for determining said security thread.

* * * * *